June 25, 1968  A. J. HEISLER, JR  3,389,415
CHIP REMOVING TOOL
Filed April 13, 1966

INVENTOR.
AUGUST J. HEISLER JR.
BY
Ralph R. Roberts
AGENT

3,389,415
CHIP REMOVING TOOL
August J. Heisler, Jr., 525 Pines Lake Drive E.,
Wayne, N.J. 07470
Filed Apr. 13, 1966, Ser. No. 542,402
6 Claims. (Cl. 15—104)

ABSTRACT OF THE DISCLOSURE

A tool for removing the chips produced in the tapping of blind holes in metal, plastic, etc., in which the tool is a tubular member having a relatively thin wall such as thirty to sixty thousandths of an inch in thickness. The tool is made of a length sufficient to reach the bottom of the hole being tapped. The outside diameter of the tool is a few thousandths of an inch smaller than the root diameter of the hole being tapped, and the entering end of the tool is formed with a non-cutting chamfered or notched edge adapted to engage the grouping of spring-like chips and direct them into the interior of the tool as the tool is rotatably advanced to the bottom of the hole being tapped.

---

This invention relates to a chip removing tool, and more particularly, to a tool for removing the chips produced in the tapping of blind holes.

More particularly this invention relates to a chip removing tool which consists of a tubular implement adapted to enter a blind tapped hole and encase within the tubular member the quality of chips produced from tapping blind or deep holes.

In the production of blind tapped holes in metal, plastic, etc. it is necessary that the process of tapping of the holes often be stopped intermediate of their completion in order to remove the chips from the hole so that the tap may go all the way to the bottom of the hole. There are many known methods customarily used in the removing of these chips, such as by blowing them out with a directed air blast and oftentimes by magnetic implements entered into the hole. In both cases, the method is slow, time-consuming, and often does not remove all of the chips.

It is the object of this invention to provide a tool for easily removing the chips from deep and blind holes at certain times during the tapping operation. It is a further object of this invention to provide a tool which removes the chips from a blind hole without the necessity of auxiliary aids such as air blasts and other means. In particular, it is the object of this invention to provide a tool that can be utilized in a drill press to remove chips from the hole after the tap has been advanced as far as it may conventionally be advanced. The tap is then removed from the hole so that the chips may be removed before reinserting the tap for completion of the tapping operation.

It is to be noted that in the process of forming threads in metal, plastic, etc., taps are customarily used in tapping the holes and as they are used necessarily throw the chips into the hole and often a large portion of them in advance of the tap itself. Very rapidly the tap and the hole become packed with chips and the tap is unable to be safely advanced further into the hole. This is particularly true in holes that are blind holes; or in other words, are holes that do not extend all the way through the piece. Since these chips must be removed before the tapping and cleaning of the hole is completed, this job often, under present circumstances and methods, is time-consuming and often incomplete. It is the intention of this invention to provide the tool that will easily and rapidly remove chips from the hole and provide a hole that is clean so that the tap may be reinserted, for the completion of the tapping of the hole.

The tool of this invention consists of a tubular form and of a length sufficient to enter to the bottom of the hole to be tapped and with a determined portion of the tool still remaining above the surface of the piece that is being tapped. This tool is further characterized in that its outer diameter is a few thousandths of an inch smaller than the root diameter of the hole being tapped; and further, that the internal diameter of the tool be of such a size as to engage and accumulate within the tool and retain therein the spring-like chips that are lying in the hole and must be removed.

These and other objects and advantages of my invention will be apparent from the following description when taken in conjunction with the attached drawing in which.

Figure 1:
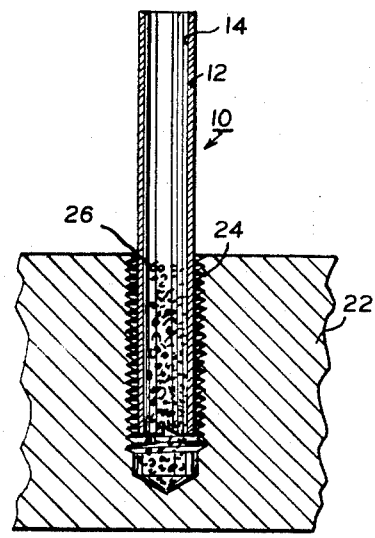
FIG. 1 is a sectional view showing the tool of this invention inserted into the tapped hole and with the chips which have resulted from the tapping of the bottom of the hole residing in the hole and within the lower end of the tube.

Referring now more particularly to the drawing in which similar numbers refer to similar parts wherein a tool 10 consists of a tubular member having an exterior surface 12 and an interior surface 14 and having a one end 16 adapted to be entered into the tapped hole. It is to be noted that the end 16 has notches 18 formed therein, said notches characterized in that the edge 20 is about parallel to the axis of the tube and is adapted to engage the chips as the tube is turned in the direction of tapping, or as the drill press rotates, the abrupt edge 20 is a forward shoulder in the direction of rotation.

Figure 2:
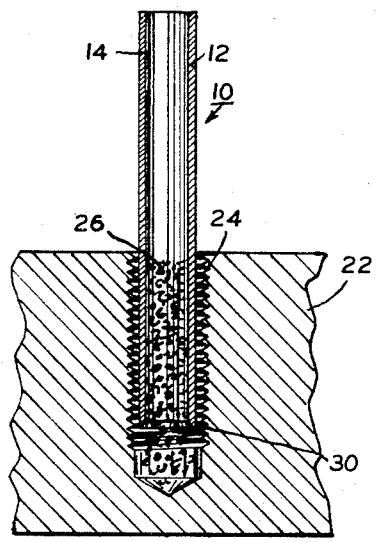
FIG. 2 is a sectional view similar to FIG. 1 and showing an alternative form of tool construction and with the chips to be removed from the hole.

Referring now to FIGS. 1 and 2, it is to be noted that the work piece 22 has a tapped hole 24 formed therein and in the process of tapping this hole chips 26 have accumulated in the tapped hole and are in the process of being accumulated within the tools of either FIG. 1 or FIG. 2.

Figure 3:
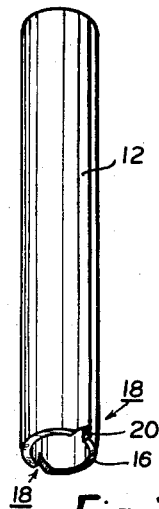
FIG. 3 is an isometric view of the tool of FIG. 1.
Figure 4:
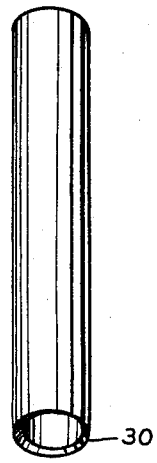
FIG. 4 is an isometric view of the tool of FIG. 2.

The tool of FIGS. 2 and 4 is similar in all respects to the tool of FIGS. 1 and 3, with the exception that the end 30 is formed with a chamfer instead of with notches.

Use and operation

In the use of this tool, it has been found that the outer diameter of the tube depends upon the size and characteristics of the hole being tapped. For example, when a deep one-quarter inch hole of twenty threads per inch is to be tapped, the tube should be made with an outer diameter 12 of a approximately one hundred ninety thousandths of an inch in diameter. This diameter is about six-thousandths of an inch smaller than the theoretical internal diameter of an American Standard Thread tapped hole. The internal diameter of this tool, however, must be such that it can accumulate the chips as a packed mass of spring-like strands of material and by the internal tension of the packed chips retain the chips within the tube. Therefore, the internal diameter of the tool for this one-quarter inch twenty thread should be about one hundred and forty to one hundred and fifty thousandths of an inch. In the case of a three-eighths inch sixteen American Standard Thread, the outside diameter of the tube should be just slightly less than three hundred thousandths of an inch in diameter, as for example, two hundred and ninety-five thousandths of an inch. The internal diameter of the tube, however, should be about two hundred and fifty to two hundred and sixty thousandths of an inch in diameter. Practical tests of this invention have shown that when the tap is of usual sharpness the threads as they cut into steel and like material produce chips which are spring-like and stringy. These chips are allowed to accumulate sufficiently so that the tool, when inserted into the hole, is caused to engage and retain the mass of chips. As the tool is rotated, the chips are forced away from the tapped thread designated 28 and are urged up into the interior 14 of the tool.

It has been found that in tapping heavy pieces having many holes, it is very convenient to use this tool in conjunction with a tapping head mounted in a drill press and the like. In conventional practice, the basic hole diameter is drilled and cleaned. The desired tap is selected and is advanced into the tapped hole as far as it can be safely advanced. When the produced chips have accumulated to the point where resistance makes further tapping dangerous, the tapping is stopped in the usual manner. The tap is withdrawn from the hole and is removed from the tapping means. At this point, the use of my new tool is now of a very great advantage. Without moving the piece 22 the tool is installed into the drill or tapping head and is then rotatably advanced into the hole as far as possible. As the tool is rotatably advanced the chips 26 are urged into and up the interior of the tube until the tool is bottomed. The tool is removed from the hole and removed from the drill or tapping head. It will be noted at this point that the chips have been packed into the interior of the tool and the tool with the chips inside has been removed from the tapped hole.

The tool 10 is cleaned by means of a rod or like instrument by which the chips are readily pushed from the tool, and the tool may then be laid aside until ready to be used to clean the hole after the next operation of tapping. The tap may then be reinserted into the tapping head and rethreaded into the hole to further tap and complete the tapping operation. As any experienced machinist knows, it depends upon the length, diameter, and type of thread as to the amount of times it is necessary to insert a tap into a blind hole to complete the tapping operation. Every time that it is necessary or desirable to clean or remove the chips from the hole, it will be found that the tool 10 as shown and described above, will very readily and conveniently remove all the chips, particularly the long and stringy ones which are so often and so difficult to remove.

In practical tests and applications, it has been found that a three-eighths of an inch tapped hole of sixteen threads per inch and two inches deep when made in mild steel requires at least as many as two or three insertions of the tap before the hole is completed. After each removal of the tap, it is necessary to remove the chips. By the regular tedious method of air and/or other means such as magnetic, it has been found to take as much as two to three minutes or longer to sufficiently remove the bulk of the chips so as to safely reinsert the tap for further tapping. However, with my tool, all that needs be done is to insert the tool, rapidly advance the tool under rotation into the hole until it bottoms, lift the tool with the chips inside from the tapped hole, reinsert the tap into the tapping head, and start the tapping operation anew. Meanwhile, with the rod, the chip removing tool is cleaned and laid to one side ready for use the next time the chips have to be removed. Actual time for inserting the tool into the hole and accumulating the chips and then removing the tool from the hole is not more than a few seconds; four or five, for example.

There is almost no wear upon the tool itself in the removing of these chips. As the exterior diameter of the chip removing tool is less than the interior diameter of the tapped hole, there is no damage to the tapped threads. In fact, the tool oftentimes may clean up any little ragged inwardly extending portions remaining on the tapped threads that has been caused by a dull or slightly imperfect tap as it has been advanced into and out of the work.

It is to be importantly noted that this tool does not require that the material being tapped be steel, but that the material may be brass, aluminum, plastic, or any other material that is tapped, and in which material the developing tapping operation produces a chip which is stringy and spring-like and usually difficult to remove from the hole. The theory governing the design of this tool is that the chips of various size and configurations have a tendency to pack together in a springy mass, and as this tool is advanced into this springy mass and is rotated, the notches 18 or the chamfer 30 of the face of the advancing tool urge the chips inwardly and into the interior of the tool so that the chips pack into the tool, and by the internal friction wtih the interior diameter of the tool, they are retained within the interior of the tool and with the tool are withdrawn from the tapped hole.

The great effectiveness of this tool is particularly with those tapped holes, whose tap size is number ten up through one-half inch in diameter. Depending upon the hole size greater than that of one-half inch and the type of thread, the chips normally developed in tapping of these larger type holes are not so difficult to remove. Therefore, the practicality of this tool in an extremely large hole depends upon the type of chips produced by the tap. It is essential that the chips produced and remaining in the hole be of sufficient volume and type so that when the tool is inserted into the tapped hole the chips are caused to pack and act as a spring-like mass to retain themselves within the tool as it is advanced to the bottom of the tapped hole. Although the tube shown is preferably made out of steel and with the surface hardened for wear and longevity, the tool may be made of brass, plastic or other material depending upon the character of the material of the piece 22 and the tapped hole which is to be cleaned.

It is to be fully noted that in extreme and long-time use, the notches and chamfers on the end of the tool have been worn almost to obliteration so that it, the tool, is almost a round-edged tube. Even under these circumstances, if the chips can be engaged and urged into the interior of the tube, the tool will accumulate the chips for removal from the hole.

While the particular tool herein shown and described in detail is fully capable of attaining all of the objects, and provide the advantages herein before stated, and although this tool is of extremely simple construction, it is to be understood that this tool is only illustrative of my invention, and it is not meant to be limited to the details of construction or design herein shown except as limited with the spirit and scope of the following claims.

I claim:

1. A tool for removing chips produced in the tapping of holes such as blind holes and deep holes as may be formed in plate material and the like, the tool adapted for repeated reentry for as many times as desired into the hole being tapped and without deformation of the threads during the entry of the tool into the hole and chip accumulation, the tool comprising: a member of generally tubular configuration and having a hole entering portion whose length is at least as great as the depth of the hole being tapped, the hole entering portion having a non-cutting end adapted to enter the hole being tapped, the outer diameter of the tool and end being a few thousandths of an inch less in diameter than the internal diameter of the hole being tapped, the internal diameter of the hole entering portion of the tube being of a selected size sufficiently less than the outer diameter of the tool, so that with the chip engaging end there is provided means for engaging the chips produced by tapping so that as the tool is rotatably advanced into the hole, those chips residing in the hole are engaged by the end of the tube so as to be urged into the inside of the tool and by the residual bias of the spring-like form of the chips and the induced friction of the chips against the interior diameter of the tool the interiorly urged chips are caused to remain within the tool as it is withdrawn from the tapped hole.

2. A chip removing tool as in claim 1 in which the chip engaging end is formed with at least one notch, said notch having one edge parallel to the longitudinal axis of the tool and adapted as the tool is turned into the work to engage the chips and urge them from the threads and into the interior of the advancing tool.

3. A chip removing tool as in claim 2 in which the inside diameter of the tool is from fifteen to thirty percent less than the outer diameter of the tool.

4. A chip removing tool as in claim 2 in which the wall of the tool is between one thirty-second and one-sixteenth of an inch in thickness.

5. A chip removing tool as in claim 1 in which the chip engaging end is formed with a chamfer, said chamfer as it extends inwardly from the outer surface having an included angle with the outer surface of less than ninety degrees the chamfered end adapted as the tool is turned into the work to engage the chips and urge them into the interior of the tool.

6. A chip removing tool as in claim 5 in which the wall of the tool is between one thirty-second and one-sixteenth of an inch in thickness.

References Cited

UNITED STATES PATENTS

| | | | |
|---|---|---|---|
| 1,605,677 | 11/1926 | McCarthy | 30—316 X |
| 1,808,472 | 6/1931 | Mielke | 77—69 |
| 2,298,975 | 10/1942 | Shelburne | 15—104.01 X |
| 2,615,245 | 10/1952 | Schaumleffel | 30—316 X |

FOREIGN PATENTS

| | | |
|---|---|---|
| 658,147 | 2/1963 | Canada. |
| 795,066 | 12/1935 | France. |
| 615,263 | 1/1949 | Great Britain. |

EDWARD L. ROBERTS, *Primary Examiner.*